US 11,796,077 B2

(12) United States Patent
Glime, III et al.

(10) Patent No.: US 11,796,077 B2
(45) Date of Patent: Oct. 24, 2023

(54) VALVE CAVITY CAP ARRANGEMENTS

(71) Applicant: Swagelok Company, Solon, OH (US)

(72) Inventors: William H. Glime, III, Chagrin Falls, OH (US); James G. McCoy, Beachwood, OH (US); Branden W. Keeper, Mentor, OH (US)

(73) Assignee: SWAGELOK COMPANY, Solon, OH (US)

( * ) Notice: Subject to any disclaimer, the term of this patent is extended or adjusted under 35 U.S.C. 154(b) by 0 days.

(21) Appl. No.: 17/518,173

(22) Filed: Nov. 3, 2021

(65) Prior Publication Data

US 2022/0146010 A1     May 12, 2022

Related U.S. Application Data

(60) Provisional application No. 63/110,443, filed on Nov. 6, 2020.

(51) Int. Cl.
*F16K 27/02*     (2006.01)
*F16K 7/16*     (2006.01)

(52) U.S. Cl.
CPC ............ *F16K 27/0236* (2013.01); *F16K 7/16* (2013.01)

(58) Field of Classification Search
CPC ..... F16K 1/14; F16K 1/16; F16K 1/20; F16K 11/022; F16K 11/04; F16K 27/0236
See application file for complete search history.

(56) References Cited

U.S. PATENT DOCUMENTS 2,323,531 A   *   7/1943   Franck ...................... F16K 7/16
                                                              251/331
5,314,164 A       5/1994   Smith
(Continued)

FOREIGN PATENT DOCUMENTS

CN            102354228        2/2012
CN            106461097        2/2017
(Continued)

OTHER PUBLICATIONS

International Search Report and Written Opinion from PCT/US2021/057663 dated Feb. 24, 2022.
(Continued)

*Primary Examiner* — Hailey K. Do
(74) *Attorney, Agent, or Firm* — Calfee, Halter & Griswold LLP (57) ABSTRACT

A valve cavity cap arrangement including an insert and a threaded cap is provided in combination with a valve body defining a valve cavity, a central passage, and at least one offset passage. The insert is received in the valve cavity and includes an inner annular sealing surface sized to seal against a portion of the recessed surface surrounding the central passage, an outer annular sealing surface sized to seal against an outer periphery of the recessed surface, surrounding the offset passage(s), and a solid web portion extending between the inner and outer annular sealing surfaces. The threaded cap includes an outer threaded portion threadably engaged with an internal threaded portion of the valve cavity, a central end portion configured to apply a first sealing force to the inner annular sealing surface, and an outer end portion configured to apply a second sealing force to the outer annular sealing surface.

20 Claims, 6 Drawing Sheets

(56) References Cited

U.S. PATENT DOCUMENTS

| | | | |
|---|---|---|---|
| 5,334,864 A | 8/1994 | Romann et al. | |
| 5,335,691 A | 8/1994 | Kolenc | |
| 5,758,864 A * | 6/1998 | Asai | F16K 31/06 251/332 |
| 5,881,997 A | 3/1999 | Ogawa et al. | |
| 5,909,747 A | 6/1999 | Schieber | |
| 6,000,416 A | 12/1999 | Kingsford et al. | |
| 6,003,791 A | 12/1999 | Reiter | |
| 6,131,826 A | 10/2000 | Teiwes | |
| 6,145,761 A | 11/2000 | Muller et al. | |
| 6,289,923 B1 | 9/2001 | Ohmi et al. | |
| 6,289,925 B1 | 9/2001 | Miyazoe et al. | |
| 6,464,202 B1 | 10/2002 | Boecking | |
| 6,685,164 B1 * | 2/2004 | Koizumi | F16K 7/16 251/63.4 |
| 6,820,855 B1 * | 11/2004 | Heller | F16K 7/12 137/485 |
| 6,871,803 B1 | 3/2005 | Tadahiro et al. | |
| 7,150,444 B2 | 12/2006 | Ohmi et al. | |
| 7,175,157 B2 | 2/2007 | Taikawa et al. | |
| 8,215,336 B2 * | 7/2012 | Jennings | F16K 27/0236 137/512.15 |
| 8,251,347 B2 | 8/2012 | Schmit et al. | |
| 9,010,729 B2 * | 4/2015 | Baumann | F16K 7/14 251/61.1 |
| 9,188,989 B1 | 11/2015 | Mudd et al. | |
| 9,194,351 B2 | 11/2015 | Albrodt et al. | |
| 9,587,608 B2 | 3/2017 | Jeannel et al. | |
| 9,638,345 B2 * | 5/2017 | Okita | F16K 7/14 |
| 9,746,102 B2 | 8/2017 | Yasuda et al. | |
| 9,829,061 B2 | 11/2017 | Ewers et al. | |
| 9,863,542 B2 | 1/2018 | Swagelok | |
| 10,006,558 B2 | 6/2018 | Suematsu | |
| 10,145,479 B2 | 12/2018 | Kitano et al. | |
| 10,781,892 B2 | 9/2020 | Cobb et al. | |
| 10,877,495 B2 | 12/2020 | Ackerman et al. | |
| 10,982,634 B2 | 4/2021 | Fochtman et al. | |
| 11,054,052 B2 | 7/2021 | Dohi et al. | |
| 11,231,026 B2 | 1/2022 | Watanabe et al. | |
| 2002/0110426 A1 | 8/2002 | Stankus et al. | |
| 2003/0042459 A1 | 3/2003 | Gregoire | |
| 2006/0060813 A1 | 3/2006 | Iwabuchi et al. | |
| 2007/0295405 A1 | 12/2007 | Okabe et al. | |
| 2008/0061171 A1 | 3/2008 | Bayer | |
| 2008/0224081 A1 | 9/2008 | Miyazaki et al. | |
| 2011/0308655 A1 | 12/2011 | Keeper et al. | |
| 2014/0217321 A1 | 8/2014 | Glime | |
| 2019/0178389 A1 | 6/2019 | Sawada et al. | |
| 2021/0207722 A1 | 7/2021 | Nakamura et al. | |
| 2021/0332900 A1 | 10/2021 | Sato et al. | |

FOREIGN PATENT DOCUMENTS

| | | |
|---|---|---|
| EP | 1300619 | 4/2003 |
| JP | H10-332020 | 12/1998 |
| JP | 2004-362036 | 12/2004 |
| JP | 2007-200133 | 8/2007 |
| JP | 2020-204369 | 12/2020 |
| JP | 2021-021408 | 2/2021 |
| KR | 10-2016-0129737 | 11/2016 |
| WO | 2019/047916 | 3/2019 |
| WO | 2021/101855 | 5/2021 |

OTHER PUBLICATIONS

International Search Report and Written Opinion from PCT/US2021/057808 dated Feb. 24, 2022.

Danfoss Data Sheet, Valve Station, copyright May 2018, 50 pgs.

* cited by examiner

VALVE CAVITY CAP ARRANGEMENTS

CROSS-REFERENCE TO RELATED APPLICATION

This application claims priority to and all benefit of U.S. Provisional Patent Application Ser. No. 63/110,443, filed on Nov. 6, 2020, for VALVE CAVITY CAP ARRANGEMENTS, the entire disclosure of which is fully incorporated herein by reference.

TECHNICAL FIELD

The inventions relate to fluid flow and delivery devices and methods, and more particularly to valves used to control fluid flow and delivery.

BACKGROUND

Valves are well known for use as flow control devices for gas and liquid fluid delivery. In the semiconductor industry as well as others, delivery of process chemicals during various processing operations is controlled using valves, for example, high purity valves. Exemplary applications for valves used in the semiconductor industry include chemical vapor deposition (CVD) and atomic layer deposition (ALD). In many applications, rapid precise control of the amount of fluid supplied is required.

SUMMARY

In accordance with an exemplary aspect of one or more of the inventions presented in this disclosure, a valve cavity cap arrangement is provided in combination with a valve body defining a valve cavity having a recessed surface from which a central passage and at least one radially offset passage extend. The valve cavity cap arrangement includes an insert and a threaded cap. The insert is received in the valve cavity and includes an inner annular sealing surface sized to seal against a portion of the recessed surface surrounding the central passage, an outer annular sealing surface sized to seal against an outer periphery of the recessed surface, surrounding the at least one radially offset passage, and a solid web portion extending between the inner annular sealing surface and the outer annular sealing surface. The threaded cap includes an outer threaded portion threadably engaged with an internal threaded portion of the valve cavity, a central end portion configured to apply a first sealing force to the inner annular sealing surface, and an outer end portion configured to apply a second sealing force to the outer annular sealing surface.

In accordance with an exemplary aspect of one or more of the inventions presented in this disclosure, a method of sealing a valve cavity is contemplated, with the valve cavity including a recessed surface from which a central passage and at least one radially offset passage extend. In the exemplary method, an insert is installed in the valve cavity, such that an inner annular sealing surface of the insert engages a portion of the recessed surface surrounding the central passage and an outer annular sealing surface of the insert engages an outer periphery of the recessed surface, surrounding the at least one radially offset passage. A cap is assembled with the valve cavity, such that a central end portion of the cap applies a first sealing force to the inner annular sealing surface, and an outer end portion of the cap applies a second sealing force to the outer annular sealing surface.

DESCRIPTION OF EXEMPLARY EMBODIMENTS

This Detailed Description merely describes exemplary embodiments and is not intended to limit the scope of the claims in any way. Indeed, the invention as claimed is broader than and unlimited by the exemplary embodiments, and the terms used in the claims have their full ordinary meaning.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include the specified value, values within 5% of the specified value, and values within 10% of the specified value, unless expressly stated otherwise. Further, it is to be understood that the drawings accompanying the present disclosure may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

Figure 1:
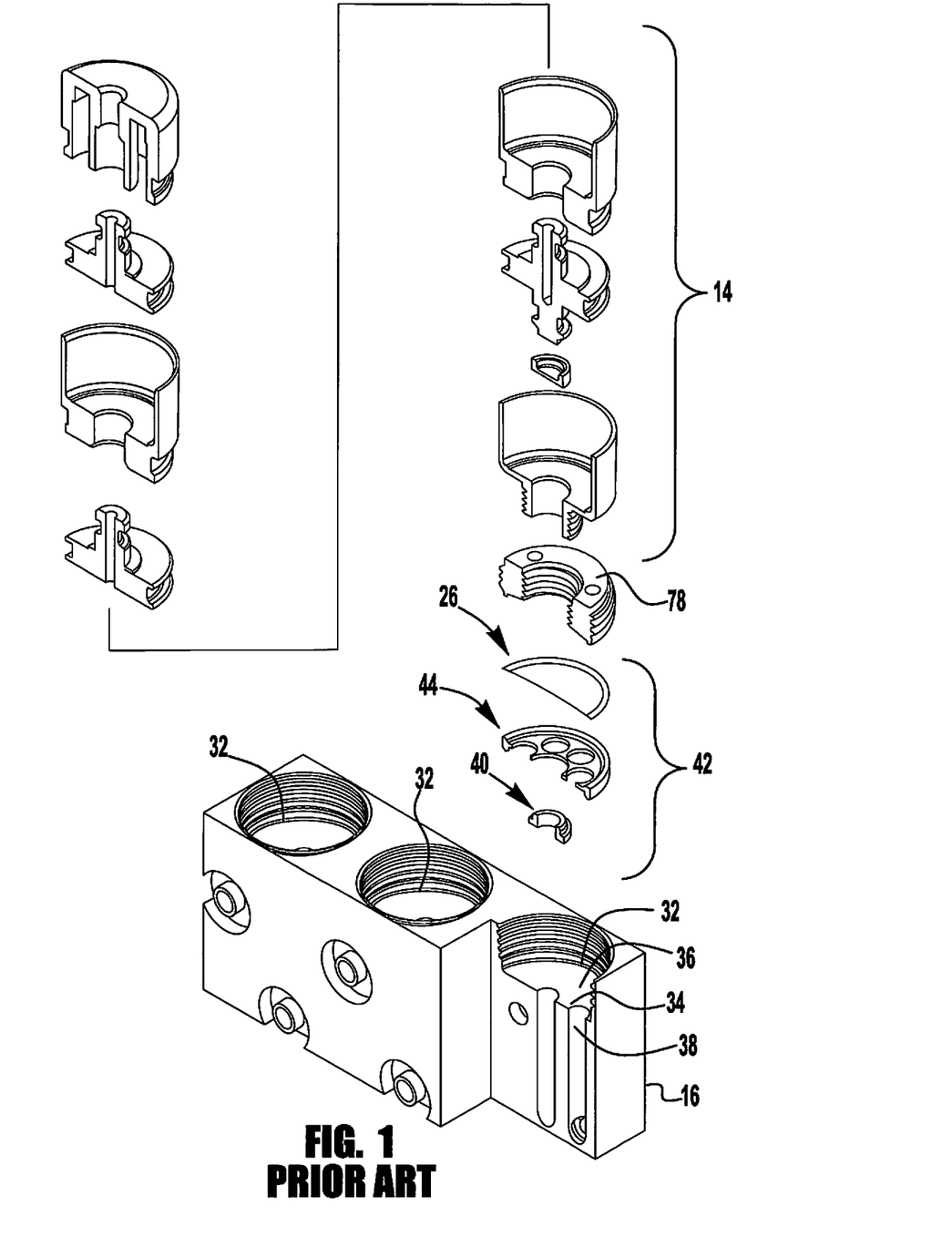
FIG. 1 is an exploded perspective view, in partial cross-section, of an exemplary diaphragm valve manifold assembly.
Figure 2:
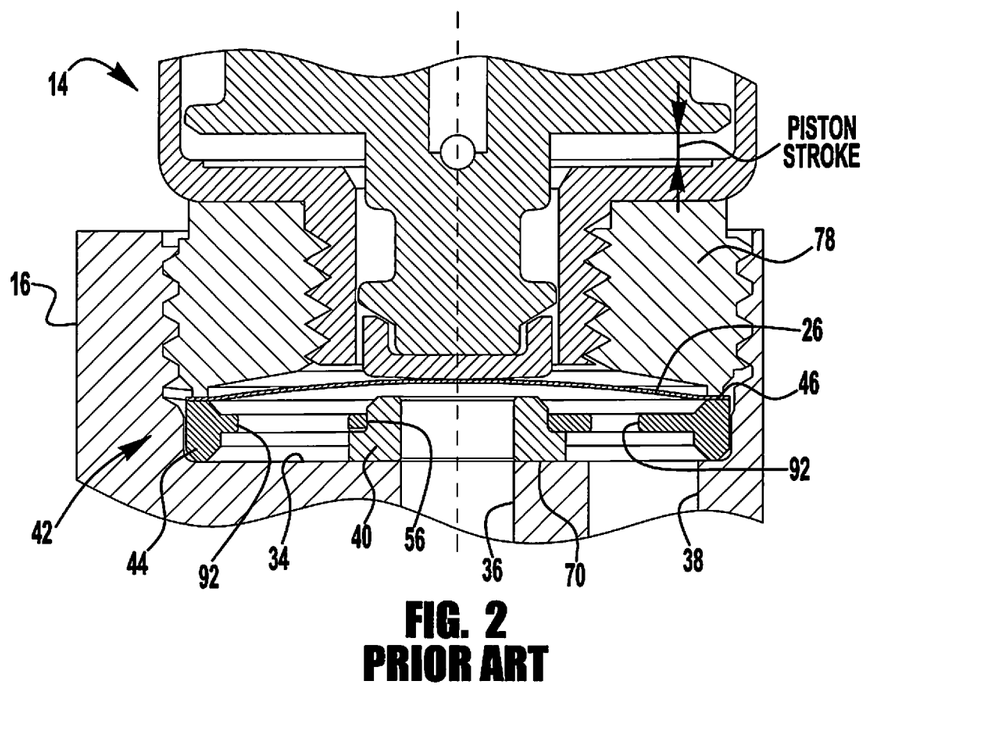
FIG. 2 is partial cross-sectional side view of a valve subassembly installed in a valve cavity of the manifold assembly of FIG. 1.

Diaphragm valves are used as flow control devices for gas and liquid fluids. In the semiconductor industry, for example, process system gases are controlled using diaphragm valves. A diaphragm valve may be installed into a process system in many different ways, including being mounted on manifolds or substrates that use surface mount technology. In one such exemplary surface mount configuration, as shown and described in co-owned U.S. Pat. No. 9,863,542 (the "'542 Patent," the entire disclosure of which is incorporated herein by reference) and reproduced in FIGS. 1 and 2 herein, a manifold body block 16 includes a plurality of internally threaded valve cavities 32 each defining a recessed surface 34 from which a central passage 36 and at least one radially offset passage 38 extend. A seat carrier subassembly 42 is installed in each valve cavity 32, and includes a seat carrier 44 defining a central opening 56 aligned with the central passage 36, and outer openings 92 substantially aligned with (e.g., at least partially radially aligned with) the at least one offset passage 38. An outer rim 46 of the seat carrier 44 supports (and may be welded to) a diaphragm 26 with the diaphragm and outer rim being clamped between the valve cavity recessed surface 34 and a bonnet nut 78 threaded into the valve cavity 32 to retain the seat carrier subassembly 78 and to provide for threaded assembly of an actuator assembly 14. A body seal 70 surrounds the central opening 56 and seals against the recessed surface 34 around the central passage 36, and a valve seat 40 (which may be integral with the body seal 70) surrounds the central opening 56 and seals against the diaphragm 26 to block flow between the central and offset passages 36, 38 when the diaphragm is in a closed (e.g., downward) position. In valve arrangements having more than one offset passage, the offset passages may be open to each other in the diaphragm's closed position, for example, to maintain flow through a fluid system, with the central passage providing for fluid sampling or injection when the diaphragm is in an open position.

In multi-valve, surface mounted manifold systems, it may be desirable to provide an array of manifolds with the same number of valve positions or valve cavities, such that each manifold assembly fits in the same footprint and allows the manifolds to be configured with a variable number of valves based on system needs, while allowing for economies of scale associated with manufacture of a single manifold body configuration. In manifold applications where valve actuated flow control at one or more of the valve positions is not required, a cap may be installed in place of the valve. In one exemplary arrangement, a flow-through cap may provide a means for the flow to pass continuously through the installed location, as if the valve cavity/position were provided with a valve that is always in an open position.

According to an exemplary aspect of the present application, in some applications, flow through one or more valve positions, for example, in a manifold assembly, may not be desired. In an exemplary embodiment, a valve cavity cap arrangement may provide a first seal portion (e.g., metal-to-metal seal) around a central passage extending to the valve cavity to block flow between the central passage and one or more outer radial passages, and an independent second seal portion around an outer periphery of the valve cavity, to prevent shell leakage of fluid in the outer radial passage(s).

Figure 3:
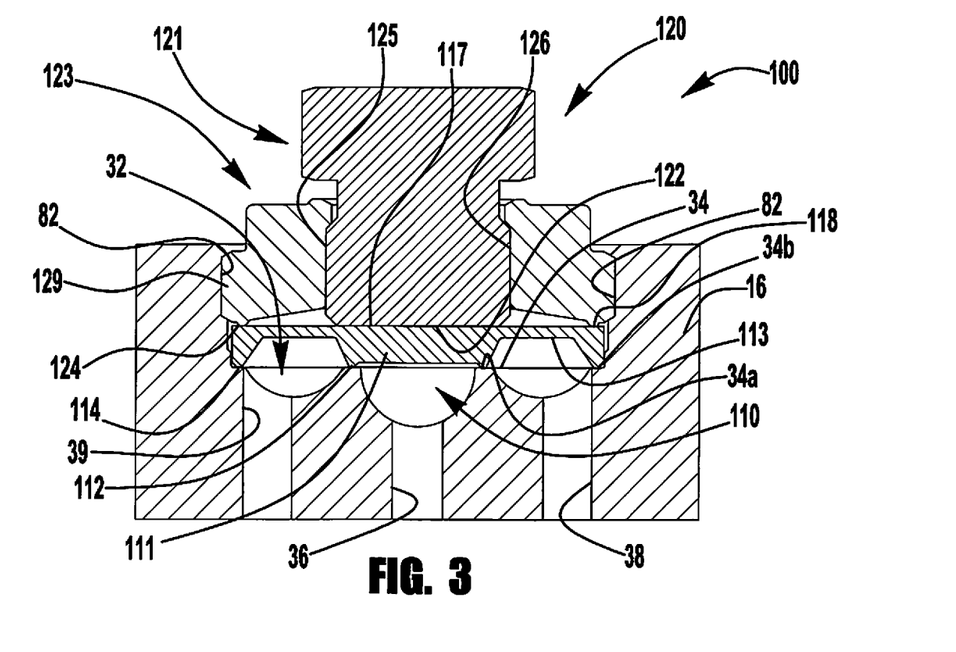
FIG. 3 is a cross-sectional side view of an exemplary valve cavity cap arrangement assembled with a valve cavity of a manifold body, according to an exemplary embodiment of the present disclosure.

In an exemplary embodiment, as shown in FIG. 3, a valve cavity cap arrangement 100 includes a seal cartridge or insert 110 sized to be received in a valve cavity 32 of a valve body (e.g., manifold body 16), and a threaded cap 120 having an outer threaded portion 129 threadably engageable with the internal threaded portion 82 of the valve cavity. The exemplary insert 110 includes a solid central portion 111 surrounded by an inner annular sealing surface (e.g., bead) 112 sized to seal against a central passage seal portion 34a of the recessed surface 34 surrounding the central passage 36, to block fluid flow to and/or from the central passage. A solid web portion 113 of the insert 110 extends between the inner annular sealing surface 112 and an outer annular sealing surface (e.g., bead) 114 sized to seal against an outer periphery seal portion 34b of the recessed surface 34, surrounding the offset passage(s) 38, 39 to provide a seal around the offset passage(s), while maintaining fluid communication between the offset passages 38, 39, in embodiments having more than one offset passage. While other materials may be used, in some embodiments, the insert 110 may be metal (e.g., stainless steel) to provide a metal-to-metal seal between the valve cavity and the insert. As used herein, "annular" may include circular or any other suitable surrounding shape (e.g., oblong, elliptical, etc.).

Figure 4:
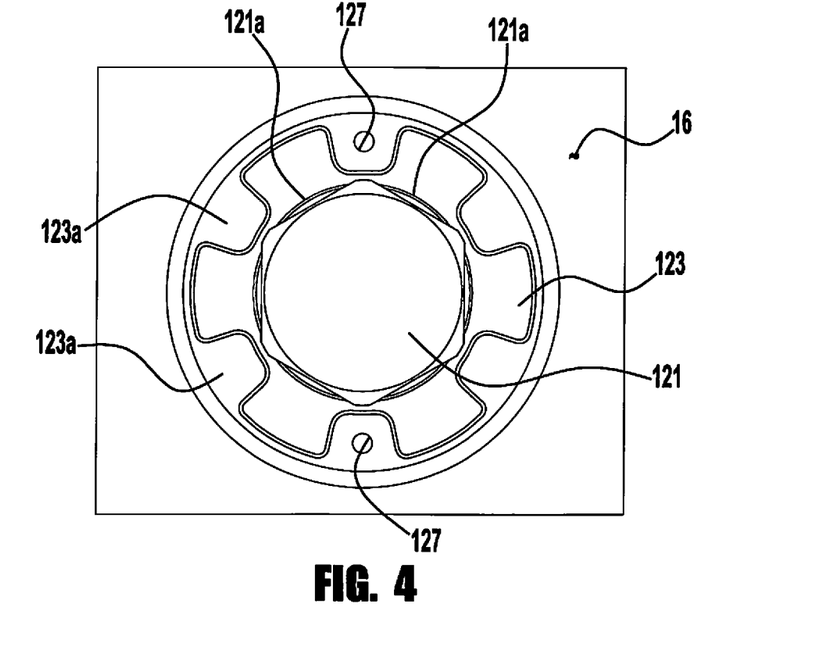
FIG. 4 is a top view of the valve cavity cap arrangement of FIG. 3.

The threaded cap 120 includes a central end portion 122 configured to engage a central bearing surface 117 of the insert 110 to apply a first sealing force to the inner annular sealing surface 112 and an outer end portion 124 (e.g., an annular sealing surface) configured to engage an outer bearing surface 118 of the insert to apply a second sealing force to the outer annular sealing surface 114. While this may be accomplished with a single-piece cap configuration, in the illustrated embodiment, the cap 120 is a two-piece configuration having an inner cap plug 121 defining the central end portion 122 assembled with an outer cap nut 123 defining the outer end portion 124, for example, by threaded engagement between an outer threaded portion 125 of the cap plug 121 and an inner threaded portion 126 of the cap nut 123. In such an arrangement, the cap plug 121 may be threadably adjusted within the cap nut 123 for independent adjustment of the first and second sealing forces. Tightening adjustments of the cap plug 121 and the cap nut 123 may be made, for example, based on tightening torque or incremental turns from a snug tight condition. As shown in FIG. 4, the cap plug 121 and the cap nut 123 may include outer grippable portions 121a, 123a to facilitate tightening with a tool (e.g., wrench flats 121a) or user hand grip (e.g., contoured hand grip portions 123a), and the cap nut 123 may be provided with one or more vent ports 127, for example, to detect leakage past the insert 110.

Additionally, according to another aspect of the present disclosure, the web portion 113 of the insert 110 may be thin enough to provide an increased degree of flexing between the outer and inner sealing beads so that differences in the valve cavity recessed surface can be accommodated and the load transfer from outer to inner seal is minimized. A suitable thickness may be selected as a function of the potential seal surface offset between the central passage seal portion 34a and the outer periphery seal portion 34b, and/or the amount of load-loss (resulting from web deflection) that may be tolerated. In an exemplary embodiment, a web portion 113 having a thickness between about 0.020" and about 0.060", or about 0.030" may be used to provide web deflection sufficient to accommodate a seal offset (e.g., due to dimensional tolerances in the valve cavity seal surfaces and/or the annular sealing surface surfaces) of up to about 0.010". In other embodiments, even thicker web portions may still allow for independent loading of the outer and inner annular sealing surfaces 114, 112 by the cap nut 123 and cap plug 121.

Figure 3A:
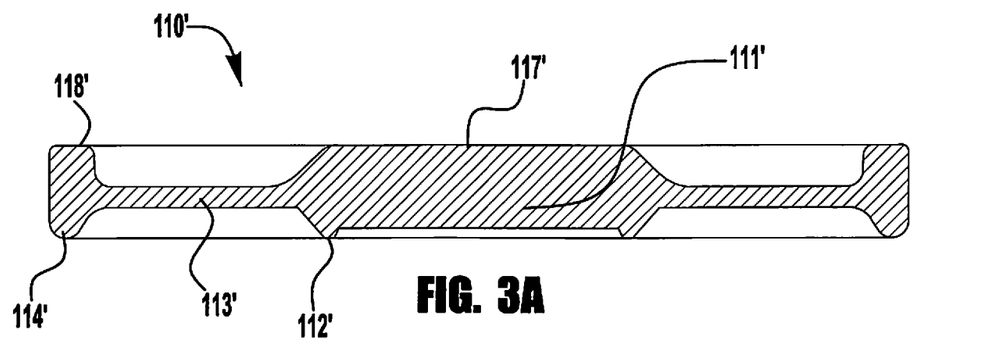
FIG. 3A is a cross-sectional side view an exemplary insert for a valve cavity cap arrangement, according to an exemplary embodiment of the present disclosure.

In the illustrated embodiment, the web portion 113 is substantially coplanar with the insert bearing surfaces 117, 118, for example, to provide an enlarged space between the valve cavity recessed surface 34 and the web portion 113 to maximize flow between the offset passages 38, 39, in embodiments having more than one offset passage. In other embodiments, as shown in FIG. 3A, the insert 110' may include a web portion 113' that is more centrally positioned axially between the upper bearing surfaces 117', 118' and the lower annular sealing surfaces 112', 114', for example, to provide increased flexibility between the outer and inner sealing beads, for example, in embodiments for which flow capacity is less critical or where only one offset passage is provided.

According to another exemplary aspect of the present application, in some fluid systems, it may be desirable to add a new fluidic connection to add or divert flow to the central passage at one or more positions, for example, to introduce a purge or chemical flow, take a pressure reading, or divert chemical to another portion of the system. In an exemplary embodiment, a valve cavity cap arrangement may include a flow diverting cartridge or insert having a central passage extending through the cap, for example, for connection with a flow loop or other flow control arrangement.

Figure 5:
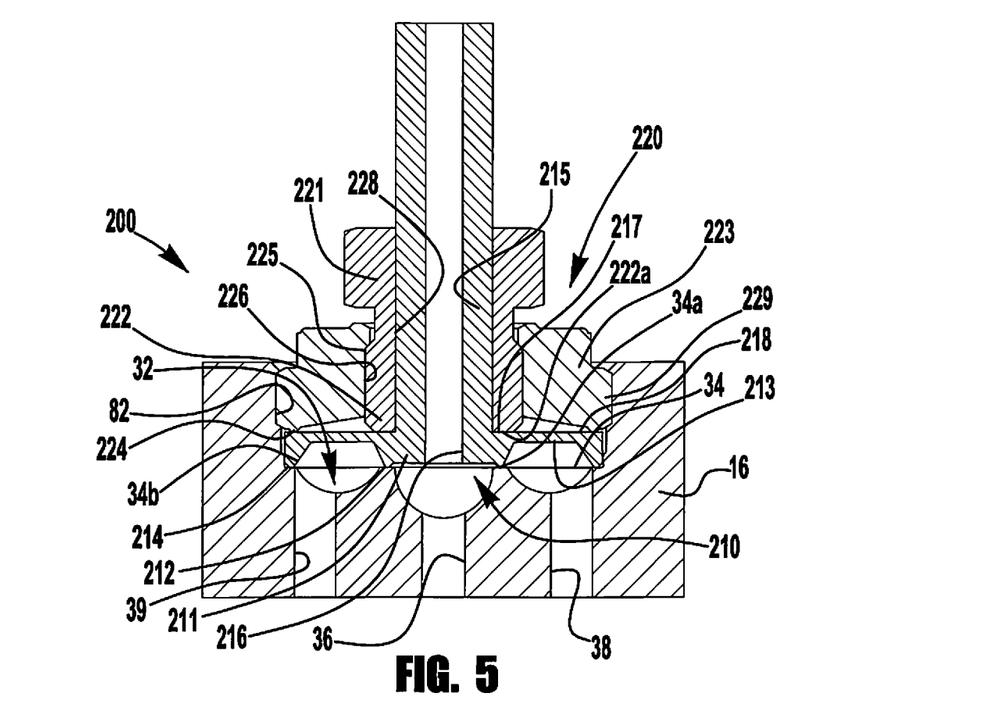
FIG. 5 is a cross-sectional side view of another exemplary valve cavity cap arrangement assembled with a valve cavity of a manifold body, according to another exemplary embodiment of the present disclosure.

In an exemplary embodiment, as shown in FIG. 5, a valve cavity cap arrangement 200 includes a flow diverting cartridge or insert 210 sized to be received in a valve cavity 32 of a manifold body 16, and a threaded cap 220 having an outer threaded portion 229 threadably engageable with the internal threaded portion 82 of the valve cavity. The exemplary insert 210 includes a tubular extension 215 extending from an apertured central portion 211, which is surrounded by an inner annular sealing surface 212 sized to seal against a seal portion 34a of the recessed surface 34 surrounding the central passage 36. The apertured central portion 211 includes a central port 216 that extends from the tubular extension 215 to an end surface of the insert, radially inward of the inner annular sealing surface 212, to provide a fluid passage between the central passage 36 and the tubular extension 215. A solid web portion 213 of the insert 210 extends between the inner annular sealing surface 212 and an outer annular sealing surface 214 sized to seal against an outer periphery 34b of the recessed surface 34, surrounding the offset passage(s) 38, 39, to provide a seal around the offset passage(s), while maintaining fluid communication between the offset passages 38, 39, in embodiments having more than one offset passage. While other materials may be used, in some embodiments, the insert 210 may be metal (e.g., stainless steel) to provide a metal-to-metal seal between the valve cavity 32 and the insert 210.

Figure 6:
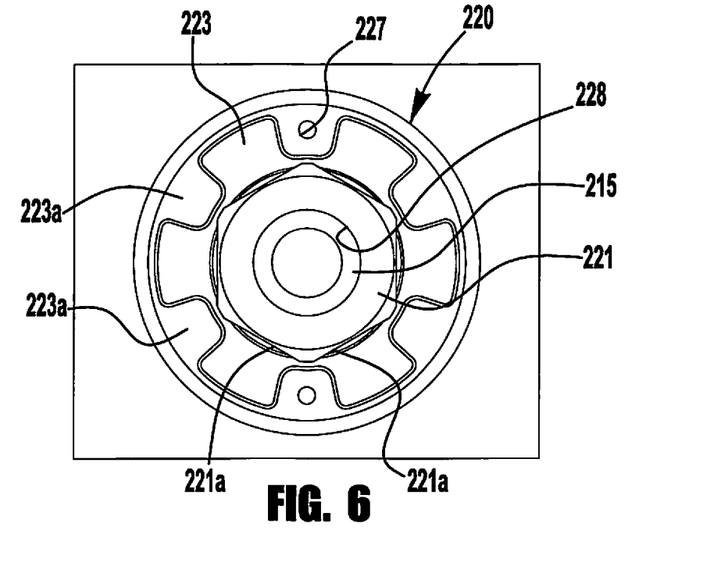
FIG. 6 is a top view of the valve cavity cap arrangement of FIG. 5.

The threaded cap 220 includes a central end portion 222 defining a central bore 228, receiving the tubular extension 215 of the insert 210 therethrough, surrounded by an annular end face 222a configured to apply a first sealing force to the inner annular sealing surface 212, and an outer end portion 224 configured to apply a second sealing force to the outer annular sealing surface 214. While this may be accomplished with a single-piece cap configuration, in the illustrated embodiment, the cap 220 is a two-piece configuration having an inner cap plug 221, defining the central end portion 222, assembled with, and axially adjustable with respect to, an outer cap nut 223 defining the outer end portion 224, for example, by threaded engagement between an outer threaded portion 225 of the cap plug 221 and an inner threaded portion 226 of the cap nut 223. In such an arrangement, the cap plug 221 may be threadably adjusted within the cap nut 223 for independent axial adjustment of the first and second sealing forces. Tightening adjustments of the cap plug 221 and the cap nut 223 may be made, for example, based on tightening torque or incremental turns from a snug tight condition. As shown in FIG. 6, the cap plug 221 and the cap nut 223 may include outer grippable portions 221a, 223a to facilitate tightening with a tool (e.g., wrench flats 221a) or user hand grip (e.g., contoured hand grip portions 223a), and the cap nut 223 may be provided with one or more vent ports 227, for example, to detect leakage past the insert 210.

Additionally, according to another aspect of the present disclosure, the web portion 213 of the insert 210 may be thin enough to provide a degree of axial flexing between the outer and inner sealing beads so that differences in the valve cavity recessed surface can be accommodated and the load transfer from outer to inner seal is minimized, for example, similar to the web portion 113 of the insert 110 of FIG. 3, as described above.

Figure 5A:
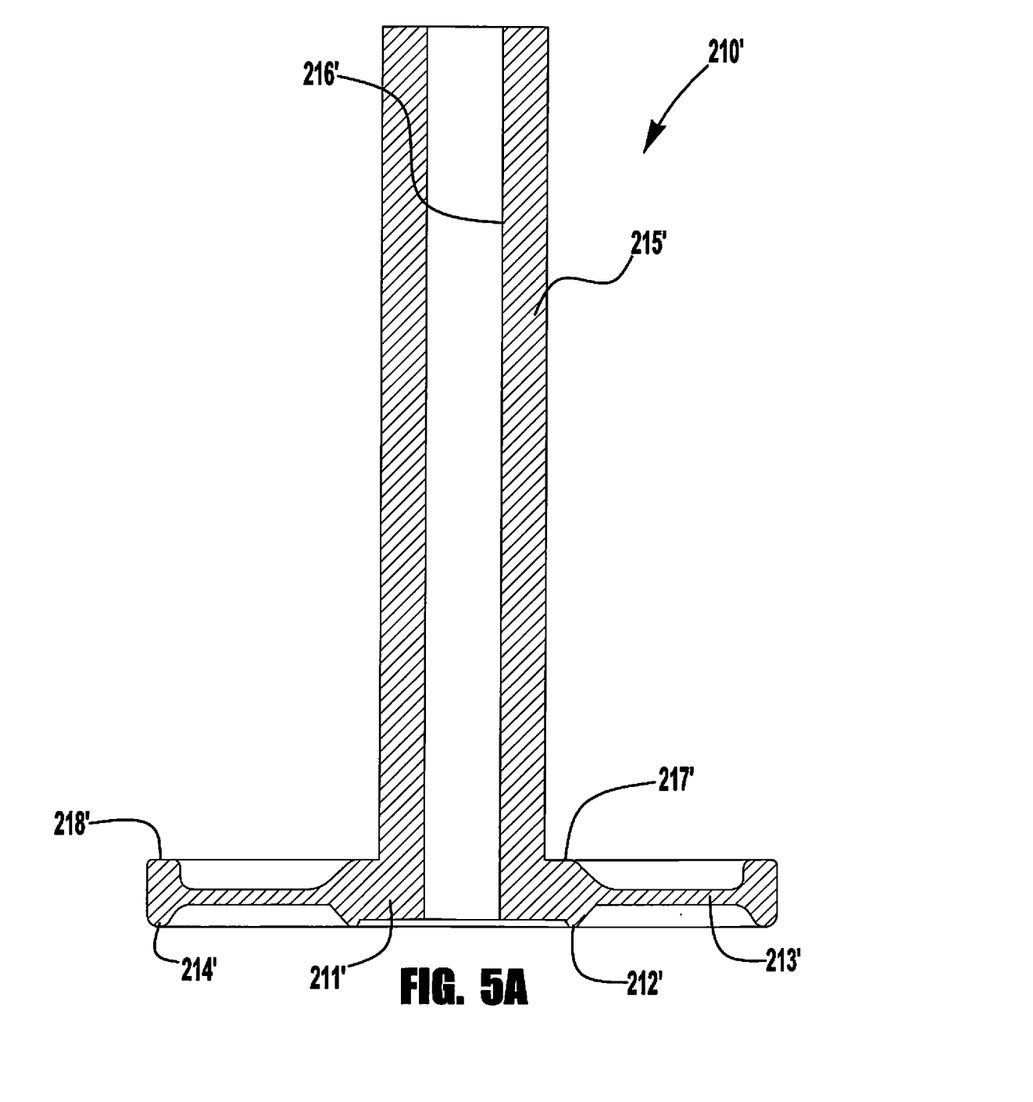
FIG. 5A is a cross-sectional side view an exemplary insert for a valve cavity cap arrangement, according to an exemplary embodiment of the present disclosure.

In the illustrated embodiment, the web portion 213 is substantially coplanar with the outer bearing surface 218, for example, to provide an enlarged space between the valve cavity recessed surface 34 and the web portion 213 to maximize flow between the offset passages 38, 39. In other embodiments, as shown in FIG. 5A, the insert 210' may include a web portion 213' that is more centrally positioned between the upper bearing surfaces 217', 218' and the lower annular sealing surfaces 212', 214', for example, to provide increased flexibility between the outer and inner sealing beads, for example, in embodiments for which flow capacity is less critical or where only one offset passage is provided.

According to another exemplary aspect of the present application, in some fluid systems, it may be desirable to add a new fluidic connection to add or divert flow to the radially offset passage(s) at one or more positions, for example, to introduce a purge or chemical flow, take a pressure reading, or divert chemical to another portion of the system. In an exemplary embodiment, a valve cavity cap arrangement may include a flow diverting cartridge or insert having a radially offset passage extending through the cap, for example, for connection with a flow loop or other flow control arrangement.

Figure 7A:
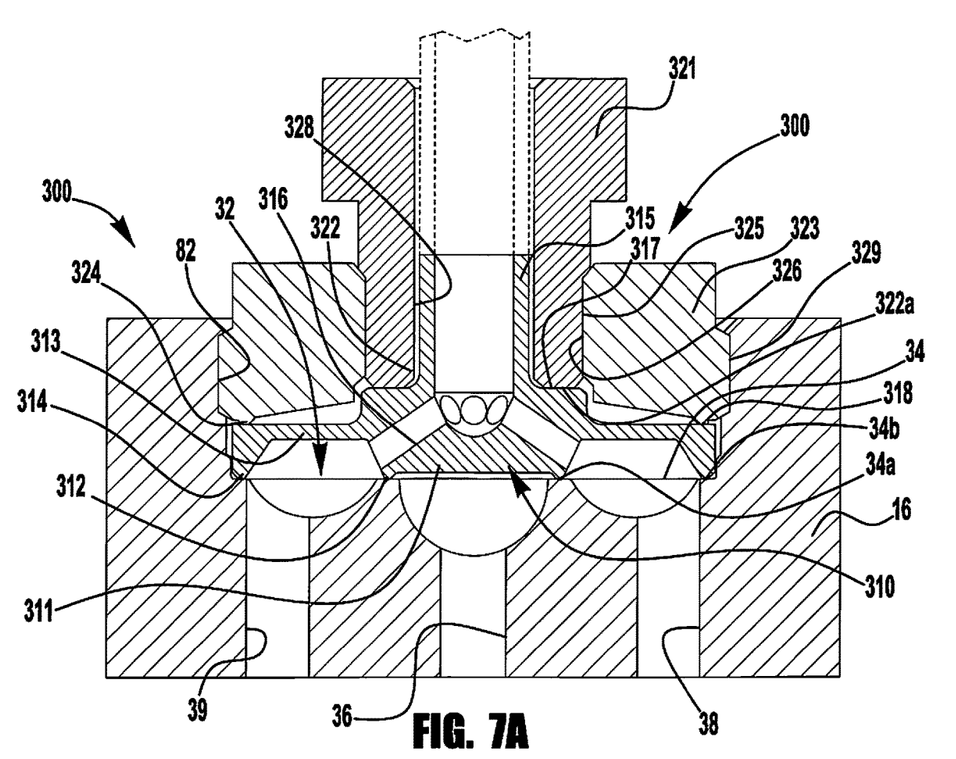
FIG. 7A is a cross-sectional side view of another exemplary valve cavity cap arrangement assembled with a valve cavity of a manifold body, according to another exemplary embodiment of the present disclosure.

In an exemplary embodiment, as shown in FIG. 7, a valve cavity cap arrangement 300 includes a flow diverting cartridge or insert 310 sized to be received in a valve cavity 32 of a manifold body 16, and a threaded cap 320 having an outer threaded portion 329 threadably engageable with the internal threaded portion 82 of the valve cavity. The exemplary insert 310 includes a tubular extension 315 extending from a solid central portion 311 surrounded by an inner annular sealing surface 312 sized to seal against a seal portion 34a of the recessed surface 34 surrounding the central passage 36, to block flow to and/or from the central passage 36. The insert 310 includes one or more ports 316 extending radially outward and axially downward from the tubular extension 315 to an end surface of the insert, radially outward of the inner annular sealing surface 312, to provide one or more fluid passages between the offset passage(s) 38, 39 and the tubular extension 315. A solid web portion 313 of the insert 310 extends between the ports 316 and an outer annular sealing surface 314 sized to seal against an outer periphery 34b of the recessed surface 34, surrounding the offset passage(s) 38, 39, to provide a seal around the offset passage(s), while maintaining fluid communication between the offset passages 38, 39, in embodiments having more than one offset passage. While other materials may be used, in some embodiments, the insert 310 may be metal (e.g., stainless steel) to provide a metal-to-metal seal between the valve cavity and the insert.

The threaded cap 320 includes a central end portion 322 defining a central bore 328, receiving the tubular central portion 311 of the insert 310 therethrough, surrounded by an annular end face 322a configured to apply a first sealing force to the inner annular sealing surface 312, and an outer end portion 324 configured to apply a second sealing force to the outer annular sealing surface 314. While this may be accomplished with a single-piece cap configuration, in the illustrated embodiment, the cap 320 is a two-piece configuration having an inner cap plug 321 defining the central end portion 322 assembled with, and axially adjustable with respect to, an outer cap nut 323 defining the outer end portion 324, for example, by threaded engagement between an outer threaded portion 325 of the cap plug 321 and an inner threaded portion 326 of the cap nut 323. In such an arrangement, the cap plug 321 may be threadably adjusted within the cap nut 323 for independent axial adjustment of the first and second sealing forces. Tightening adjustments of the cap plug 321 and the cap nut 323 may be made, for example, based on tightening torque or incremental turns from a snug tight condition. Similar to the features shown in the embodiments of FIGS. 4 and 6, the cap plug 321 and the cap nut 323 may include outer flatted portions to facilitate tightening with a tool (e.g., wrench), and the cap nut 323 may be provided with one or more vent ports, for example, to detect leakage past the insert 310.

Figure 7B:
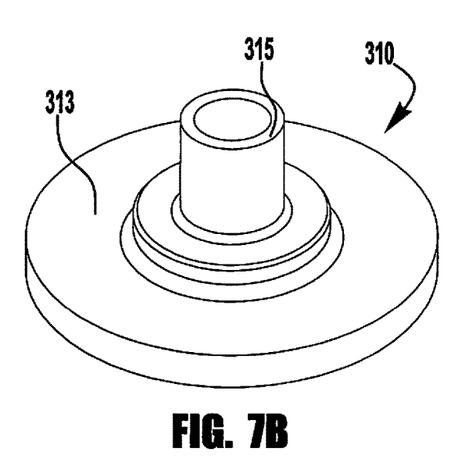
FIG. 7B is an upper perspective view of the insert of the valve cavity cap arrangement of FIG. 7A.
Figure 7C:
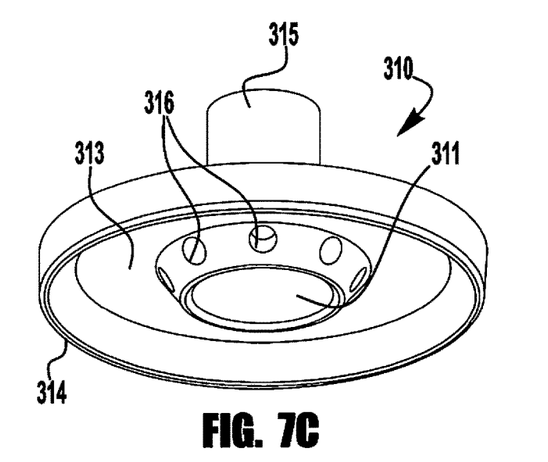
FIG. 7C is a lower perspective view of the insert of the valve cavity cap arrangement of FIG. 7A.

FIGS. 7A and 7B illustrate upper and lower views of the exemplary insert 310. As shown in FIG. 7B, the insert 310 may include multiple ports 316 circumferentially spaced around the insert, for example, to provide for increased flow between the offset passage(s) 38, 39 and the tubular extension 315. While the insert 310 may be machined with the multiple port configuration, the insert 310 (as well as any of the other components described herein) may be manufactured using additive manufacturing (e.g., 3D printing) and/or welded configurations (e.g., an insert formed from a tubular extension welded to a ported base).

Additionally, according to another aspect of the present disclosure, the web portion 313 of the insert 310 may be thin enough to provide a degree of axial flexing between the outer and inner sealing beads so that differences in the valve cavity recessed surface can be accommodated and the load transfer from outer to inner seal is minimized, for example, similar to the web portion 113 of the insert 110 of FIG. 3, as described above.

In the illustrated embodiment, the web portion 313 is substantially coplanar with the outer bearing surface 318, for example, to provide an enlarged space between the valve cavity recessed surface 34 and the web portion 313 to maximize flow between the offset passages 38, 39. In other embodiments (not shown), the insert may include a web portion that is more centrally positioned between the upper bearing surfaces and the lower annular sealing surfaces, for example, to provide increased flexibility between the outer and inner sealing beads, for example, in embodiments for which flow capacity is less critical or where only one offset passage is provided.

The inventive aspects have been described with reference to the exemplary embodiments. Modification and alterations will occur to others upon a reading and understanding of this specification. It is intended to include all such modifications and alterations insofar as they come within the scope of the appended claims or the equivalents thereof.

We claim:

1. A combination comprising:
   a valve body defining a valve cavity having a recessed surface from which a central passage and at least one radially offset passage extend; and
   a valve cavity cap arrangement comprising:
      an insert received in the valve cavity, the insert including:
         an inner annular sealing surface sized to seal against an inner periphery of the recessed surface surrounding the central passage;
         an outer annular sealing surface sized to seal against an outer periphery of the recessed surface, surrounding the at least one radially offset passage; and
         a solid web portion extending between the inner annular sealing surface and the outer annular sealing surface; and
      a threaded cap having:
         an outer threaded portion threadably engaged with an internal threaded portion of the valve cavity;
         an outer end portion configured to apply a first sealing force to the outer annular sealing surface; and
         a central end portion configured to apply a second sealing force to the inner annular sealing surface;
      wherein the insert includes a tubular extension extending through a central bore in the central end portion of the threaded cap and a lower port disposed in a central portion of the insert to provide a fluid passage between the tubular extension and one of the central passage and the at least one radially offset passage of the valve body, for supplying fluid flow to or from the one of the central passage and the at least one radially offset passage.

2. The combination of claim 1, wherein the insert comprises metal.

3. The combination of claim 1, wherein the solid web portion is axially flexible.

4. The combination of claim 1, wherein the solid web portion has a thickness between about 0.020 inches and about 0.060 inches.

5. The combination of claim 1, wherein the valve body comprises a manifold body block including a plurality of valve cavities.

6. The combination of claim 1, wherein the lower port extends radially outward from the tubular extension to an end surface of the insert radially outward of the inner annular sealing surface.

7. The combination of claim 1, wherein the threaded cap includes at least one vent port.

8. The combination of claim 1, wherein the central end portion of the threaded cap engages a central bearing surface of the insert and the outer end portion engages an outer bearing surface of the insert, and wherein the solid web portion is substantially coplanar with the outer bearing surface.

9. The combination of claim 1, wherein the central end portion of the threaded cap engages a central bearing surface of the insert and the outer end portion engages an outer bearing surface of the insert, and wherein the solid web portion is disposed axially between the central and outer bearing surfaces and the inner and outer annular sealing surfaces.

10. The combination of claim 1, wherein the at least one radially offset passage comprises first and second radially offset passages, the first radially offset passage being in fluid communication with the second radially offset passage.

11. The combination of claim 1, wherein the threaded cap comprises an inner cap plug defining the central end portion and an outer cap nut assembled with the inner cap plug and defining the outer end portion, the inner cap plug being axially adjustable with respect to the outer cap nut.

12. The combination of claim 11, wherein the inner cap plug includes an outer threaded portion in threaded engagement with an inner threaded portion of the outer cap nut.

13. A method of sealing a valve cavity including a recessed surface from which a central passage and at least one radially offset passage extend, the method comprising:
providing a single piece insert including:
a central portion having an upper central bearing portion and a lower inner annular sealing bead extending from a lower surface of the central portion;
an outer peripheral portion having an upper outer bearing surface and a lower outer annular sealing bead; and
a solid web portion extending between the central portion and the outer peripheral portion;
installing the single piece insert in the valve cavity, such that the lower inner annular sealing bead engages an inner periphery of the recessed surface surrounding the central passage and the lower outer annular sealing bead engages an outer periphery of the recessed surface, surrounding the at least one radially offset passage;
providing a threaded cap comprising:
an outer cap nut having an outer threaded portion threadably engaged with an internal threaded portion of the valve cavity, the outer cap nut defining an outer end portion radially aligned with the outer annular sealing bead; and
an inner cap plug assembled with the outer cap nut, the inner cap plug extending from a user grippable upper exterior portion to a central end portion defining an end face radially aligned with the inner annular sealing bead;
assembling the outer cap nut with the valve cavity, such that the outer end portion of the threaded cap applies a first sealing force between the outer annular sealing bead and the outer periphery of the recessed surface; and
axially adjusting the inner cap plug within the outer cap nut, such that the central end portion end face applies a second sealing force between the inner annular sealing bead and the inner periphery of the recessed surface.

14. The method of claim 13, wherein axially adjusting the inner cap plug within the outer cap nut comprises threadably adjusting an outer threaded portion of the inner cap plug with an internal threaded portion of the outer cap nut.

15. The method of claim 13, wherein the at least one radially offset passage comprises first and second radially offset passages, wherein when the threaded cap is assembled with the valve cavity, the first radially offset passage is in fluid communication with the second radially offset passage.

16. A combination comprising:
a valve body defining a valve cavity having a recessed surface from which a central passage and at least one radially offset passage extend; and
a valve cavity cap arrangement comprising:
a single piece insert received in the valve cavity, the single piece insert including:
a central portion having an upper central bearing surface and a lower inner annular sealing bead extending from a lower surface of the central portion and sized to seal against an inner periphery of the recessed surface surrounding the central passage;
an outer peripheral portion having an upper outer bearing surface and a lower outer annular sealing bead sized to seal against an outer periphery of the recessed surface, surrounding the at least one radially offset passage; and
a solid web portion extending between the central portion and the outer peripheral portion; and
a threaded cap comprising:
an outer cap nut including an outer threaded portion threadably engaged with an internal threaded portion of the valve cavity, the outer cap nut defining an outer end portion radially aligned with the outer annular sealing bead and engageable with the upper outer bearing surface to apply a first sealing force between the outer annular sealing bead and the outer periphery of the recessed surface; and
an inner cap plug assembled with the outer cap nut, the inner cap plug extending from a user grippable upper exterior portion to a central end portion defining an end face radially aligned with the inner annular sealing bead and engageable with the upper central bearing surface to apply a second sealing force between the inner annular sealing bead and the inner periphery of the recessed surface.

17. The combination of claim 6, wherein the insert includes a solid central portion surrounded by the inner annular sealing bead.

18. The combination of claim 16, wherein the single piece insert is a single piece metal insert.

19. The combination of claim 16, wherein the inner cap plug is a single piece inner cap plug.

20. The combination of claim 16, wherein the solid web portion is substantially coplanar with the upper central bearing surface, and the central portion and the outer peripheral portion of the insert extend from the solid web portion to provide an enlarged space between the valve cavity recessed surface and the solid web portion.

* * * * *

UNITED STATES PATENT AND TRADEMARK OFFICE
CERTIFICATE OF CORRECTION

PATENT NO. : 11,796,077 B2
APPLICATION NO. : 17/518173
DATED : October 24, 2023
INVENTOR(S) : William H. Glime, III et al.

It is certified that error appears in the above-identified patent and that said Letters Patent is hereby corrected as shown below:

In the Claims

Column 10, Claim 17, "claim 6" should read ---claim 16---.

Signed and Sealed this
Nineteenth Day of December, 2023

Katherine Kelly Vidal
*Director of the United States Patent and Trademark Office*